United States Patent
Benedí Santamaria et al.

(10) Patent No.: US 12,193,453 B2
(45) Date of Patent: Jan. 14, 2025

(54) FATTY PREPARATION, A PROCESS FOR MAKING SAID FATTY PREPARATION, AND A PRODUCT CONTAINING THE SAME

(71) Applicant: BORGES AGRICULTURAL & INDUSTRIAL EDIBLE OILS S.A.U., Tarrega (ES)

(72) Inventors: Carolina Cristina Benedí Santamaria, Tarrega (ES); Maria de la O Martín Martín, Madrid (ES); José Vicente García Berrocal, Madrid (ES); Pedro Antonio Estelles Blay, Madrid (ES)

(73) Assignee: BORGES AGRICULTURAL & INDUSTRIAL EDIBLE OILS S.A.U., Tarrega (ES)

( * ) Notice: Subject to any disclaimer, the term of this patent is extended or adjusted under 35 U.S.C. 154(b) by 879 days.

(21) Appl. No.: 17/046,457

(22) PCT Filed: Apr. 8, 2019

(86) PCT No.: PCT/EP2019/058823
§ 371 (c)(1),
(2) Date: Oct. 9, 2020

(87) PCT Pub. No.: WO2019/197344
PCT Pub. Date: Oct. 17, 2019

(65) Prior Publication Data
US 2021/0161169 A1    Jun. 3, 2021

(30) Foreign Application Priority Data
Apr. 9, 2018    (EP) .................... 18382241

(51) Int. Cl.
*A23G 1/36* (2006.01)
*A21D 2/18* (2006.01)
*A21D 13/16* (2017.01)
*A23G 3/40* (2006.01)

(52) U.S. Cl.
CPC .............. *A23G 1/36* (2013.01); *A21D 2/183* (2013.01); *A21D 13/16* (2017.01); *A23G 3/40* (2013.01); *A23G 2200/08* (2013.01)

(58) Field of Classification Search
None
See application file for complete search history.

(56) References Cited

U.S. PATENT DOCUMENTS

| | | | |
|---|---|---|---|
| 5,612,078 A | 3/1997 | Fileti et al. | |
| 5,939,127 A * | 8/1999 | Abboud | ................ A23G 3/346 426/573 |
| 5,968,583 A | 10/1999 | Gautchier et al. | |
| 2010/0298274 A1* | 11/2010 | Hughes | .................. A61P 13/08 426/89 |
| 2017/0258106 A1 | 9/2017 | Rabault et al. | |

OTHER PUBLICATIONS

Dictionary of Food Ingredients (4th Edition 2001) b; By: Igoe, Robert S. Publisher: Springer—Verlag pp. 35 and 81 (Year: 2001).*
Search Report in International Application No. PCT/EP2019/058823 dated Jul. 1, 2019, 2 pages.

* cited by examiner

*Primary Examiner* — Jyoti Chawla
(74) *Attorney, Agent, or Firm* — MARSHALL, GERSTEIN & BORUN LLP

(57) ABSTRACT

The present invention relates to a process for making an anhydrous fatty preparation to be incorporated in a product selected from a bakery product, a personal care product, cosmetics, dermocosmetics, soaps, varnishes, paints or snacks, preferably a bakery product, wherein said fatty preparation does not comprise fats with a saturated fat content higher than 35% by weight, nor trans fats, nor animal-derived products, nor totally or partially hydrogenated oils or fats, nor interesterified or transesterified fats, nor palm or coconut-derived oils or fats. The present invention further relates to a anhydrous fatty preparation and to a bakery product, a personal care product, cosmetics, dermocosmetics, soaps, varnishes, paints or snacks, preferably a bakery product comprising the same.

20 Claims, No Drawings

FATTY PREPARATION, A PROCESS FOR MAKING SAID FATTY PREPARATION, AND A PRODUCT CONTAINING THE SAME

FIELD OF THE INVENTION

The present invention relates to the field of foodstuff. In particular, the present invention relates to an anhydrous fatty preparation which does not comprise fats with a saturated fat content higher than 35% by weight, nor trans fats, nor animal-derived products, nor totally or partially hydrogenated oils or fats, nor interesterified or transesterified fats, nor palm or coconut-derived oils or fats, i.e. all harmful fatty acids for health, a process for making such fatty preparation and a product containing the same.

BACKGROUND

The discussion about the use of palm oil in the processed food industry has marked the entire sector in recent years. However, while the social and media pressure grows against a foodstuff whose nutritional properties and its productive process are questioned, the sector is betting more than ever on this ingredient.

The first data of 2017 show that the trend continues to rise. According to the trade register, palm oil has been imported by a value of 216 million between January and February, almost twice as much as in the same months of the previous year.

However, the sector intends to calm the discussion about this product. Sources of the Spanish processed food industry assure that the properties of this ingredient "allow to enjoy a wide range of safe products for human consumption". In particular, it is highlighted that it allows to extend the useful life of food.

There are many voices which have criticized the use of this food. On the one hand, NGOs and environmental organizations have criticized the environmental impact of their production. But the criticism of palm oil is made, above all, from the point of view of health. In 2016, the European Food Safety Agency (EFSA) conducted an assessment of three potential food contaminants: glycidyl fatty acid esters (GE), 3-monochloropropanediol (3-MCPD), and 2-monochloropropanediol (2-MCPD). These substances are present in many different oils and fats, although, the highest levels of GE, 3-MCPD, and 2-MCPD are found in palm oil and palm fats. They are formed during food processing, particularly when refining oils at high temperatures (about 200° C.). For consumers aged three and above, margarines and 'pastries and cakes' were the main sources of exposure to all substances.

The present inventors have particularly focused on the bakery sector. Salt, added sugar and saturated and hydrogenated fats are three unhealthy elements that are often present in ultra processed products, such as industrial bakery. Regarding fats, among which oil is included, most of them which are used in these products are of low nutritional quality. One of the reasons is the price. Employing cheap ingredients also reduces the final cost for the final consumer.

Palm oil is an ingredient that fits very well with this description, it has a texture that allows it to be used as a substitute for butters and margarines and as a replacement ingredient for hydrogenated and trans fats. These characteristics make it the ideal candidate to be part of many products that the population usually consume, but it is very rich in saturated fats. Its nutritional profile is, therefore, different from that of sunflower oil or olive oil. Several scientific studies suggest that a diet rich in saturated fats can increase cardiovascular risk, in addition to increasing the levels of "bad" cholesterol and insulin resistance, a risk factor for type 2 diabetes. To these harmful effects the weight gain is also added.

Nowadays it is well known the recommendation of avoiding foods that contain palm oil, coconut oil, or hydrogenated or partially hydrogenated fats, since these last nomenclatures indicate that this is a product with trans fatty acids.

However, this kind of products are very attractive, and not only for the price. Its composition makes them very palatable, something that influences in food preferences. Some researches state that the most preferred products have a common trait: a flavor that is enhanced with three ingredients (salt, sugar and fat) that, in excess, are dangerous for health.

However, it is not the only fat that we can use to make sweet products. We find a large number of lipids that are worth knowing. The main fats that can be used in bakery are:
  Edible animal fats: Butter, lard, ghee, . . .
  Fats of non-animal origin
  Transformed or mixed fats: Margarines
  Edible vegetable fats: Oils, cocoa butter, coconut oil or butter, palm butter, shortenings.

Accordingly, the present inventors provide a new fatty preparation, a process for making thereof and products containing thereof that solve the above mentioned problems. In particular, they have achieved the following goals:
  Reduction or removal of saturated fats with respect to coconut or palm fats
  Does not contain partially or totally hydrogenated fatty acids
  Without trans fatty acids
  Rich in oleic and linoleic acids
  Decrease of the environmental impact compared to palm oil or butter
  In case of products with salt, the introduction of water or glycerin (aqueous base) in the bakery formula facilitates the dispersion of the salt giving rise to a more homogeneous product and even allowing an increase in the useful life, also admitting a greater salt concentration for its greater solubility in water than in oil.
  The use of carrageenan improves the stability of the formula avoiding losses of oil.

SUMMARY OF THE INVENTION

In a first aspect, the present invention relates to a process for making a anhydrous fatty preparation to be incorporated in a product selected from a bakery product, a personal care product, cosmetics, dermocosmetics, soaps, varnishes, paints or snacks, preferably a bakery product, wherein said fatty preparation does not comprise fats with a saturated fat content higher than 35% by weight, nor trans fats, nor animal-derived products, nor totally or partially hydrogenated oils or fats, nor interesterified or transesterified fats, nor palm or coconut-derived oils or fats.

In a second aspect, the present invention relates to an anhydrous fatty preparation as defined further below.

In a third aspect, the present invention relates to a bakery product, a personal care product, cosmetics, dermocosmetics, soaps, varnishes, paints or snacks, preferably a bakery product, comprising the anhydrous fatty preparation according to the second aspect.

In a fourth aspect, the present invention relates to the use of the anhydrous fatty preparation according to second aspect, as a substitute component for fat or animal-derived ingredients to be incorporated in a product selected from a bakery product, a personal care product, cosmetics, dermocosmetics, soaps, varnishes, paints or snacks.

DETAILED DESCRIPTION OF THE INVENTION

In a first aspect, the present invention relates to a process for making an anhydrous fatty preparation to be incorporated, in particular as a substitute component for fat or animal-derived ingredients, in a product selected from a bakery product, a personal care product, cosmetics, dermocosmetics, soaps, varnishes, paints or snacks, wherein said fatty preparation does not comprise fats with a saturated fat content higher than 35% by weight, nor trans fats, nor animal-derived products, nor totally or partially hydrogenated oils or fats, nor interesterified or transesterified fats, nor palm or coconut-derived oils or fats, comprising the steps of:
- a) heating an oil selected from the group consisting of high oleic sunflower oil, olive oil, extra virgin olive oil, sunflower seed oil, rapeseed oil, grapeseed oil and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in an amount preferably between 1 and 96% by weight with respect to the total preparation in a butterfly-propeller or cutter-type-mixer up to between 60° C. and 95° C.;
- b) adding a fatty acid mono- and diglycerides-type emulsifier selected from E-471, E-472, E-475 or a mixture thereof in an amount preferably between 1 and 60% by weight with respect to the total preparation to mixer of step a) until obtaining a complete dissolution;
- c) increasing the temperature of the dissolution in step b) to or keeping at a maximum of 95° C.;
- d) adding glycerol in an amount preferably between 0.1 and 20% by weight with respect to the total preparation into a cutter-type mixer and dispersing carob and carrageenan in an amount each preferably between 0.25 and 10% by weight with respect to the total preparation into the glycerol until an homogeneous semi-solid is obtained;
- e) pouring the solution obtained in c) over the semi-solid obtained in d) until a viscous homogeneous liquid is obtained, providing that the amount of the components added in steps a) to d) does not exceed 100%.

The percentage for each component should be considered independently each other.

Examples of "said other vegetable oil which is liquid at room temperature containing less than 30% wt of saturated fats" are, but not limited thereto, rice bran oil, cotton oil, safflower oil and almond oil.

In a further embodiment, the process further comprises the step of:
- f) packing the viscous homogeneous liquid obtained in step e) and optionally, storing the packed viscous homogeneous liquid in a refrigerator for at least 24 hours.

In the context of the present invention the term "a saturated fat" is understood as fatty acids which do not have double bonds in their chain. Examples thereof include, but not limited thereto, palm or coconut oil.

The term "trans fats" is understood as unsaturated fats that are formed in the industrial processing of some foods known as hydrogenation, during which their configuration is changed. Examples thereof include, but not limited thereto, partially hydrogenated fats.

The term "totally or partially hydrogenated oils or fats" is understood as unsaturated fats that undergo a chemical process (hydrogenation) in order to incorporate hydrogen into their structure and thus solidify them. The process can be applied completely making them completely saturated or partial saturated (only a part of the fat is used). Partial hydrogenation can lead to trans fats.

The term "interesterified fats" is understood as fats that have undergone a chemical process by catalysts or enzymes, rearranging their fatty acids to convert them into solid fats.

The term "bakery product" is understood as food products which are basically made with fermented or non-fermented, stuffed or non-stuffed flour dough, whose main ingredients are flours, oils or fats, water, with or without yeast, to which other foods, bread additives or authorized additives can be added and which have been subjected to a suitable thermal treatment. Examples thereof include, but not limited thereto, puff pastry, croissant, "pain au chocolat", ensaimadas, brioche, "elephant ears", . . .

The term "personal care product" is understood as any substance or preparation that, without having the legal consideration of cosmetic, biocide, sanitary product or medication, is intended to be applied on the skin, teeth or mucous membranes of the human body for the purpose of hygiene or aesthetics, or to neutralize or eliminate ectoparasites. Examples thereof include, but not limited thereto, deodorants, toothpastes, shampoo . . .

The term "cosmetics" is understood as a substance intended to be applied to the human body to clean, beautify or alter the appearance without affecting the structure of the body or functions thereof. Examples thereof include, but not limited thereto, moisturizers, sunscreens, makeup . . .

The term "dermocosmetic" is understood as complex mixtures that are mainly composed of an aqueous phase and a fat phase, in addition to other additives that provide the cream with the desirable texture, color or smell from a commercial point of view, as well as stabilizers, antioxidants, preservatives, perfumes and the active ingredients that determine the purpose of the cream. The fat phase is in a solid or semi-solid condition for obtaining a final product with an adequate oiliness to spread on the skin and melt at body temperature. The melting ranges can range from 35 to 60° C. depending on the use of the cream. Preferably, the environment temperature is preferably 45° C. but that depends on the type used: penetrating, non-penetrating creams, ointments, protectors, . . .

The term "snacks" is understood as a light food usually eaten between meals. Examples thereof include, but not limited thereto, chips, popcorn, cereal bars with and without chocolate, . . .

The present invention encompass different products such as a bakery product, a personal care product, cosmetics, dermocosmetics, soaps, varnishes, paints or snacks, which incorporate the fatty preparation as disclosed herein. The reason for including so different products such as food products and cosmetics is that all of them follow an equivalent formulation or composition, have a similar texture and melting point. Generally speaking, in the case of bakery products, an aqueous phase usually water or a milk based product or milk or yogurt to which other soluble solutes are added and a fat phase usually butter, palm fat etc . . . in a solid or semi-solid condition to achieve a product which melts at a body temperature of about 25-40° C. so that the food can be metabolized. The mouth melting point is about 36° C. This product also contains stabilizers, antioxidants, preservatives and flavors for each specific purpose.

E-471 is also defined as fatty acid mono- and diglycerides.

E-472 is also defined as fatty acid mono- and diglycerides esters.

E-475 is also defined as fatty acid polyglycerides esters.

In a preferred embodiment, wherein in step d) in addition to carob and carrageenan at least one of the following ingredients is added: guar gum, gum Arabic, meal, starch (rice, corn, potato), modified starch, salt, soy lecithin, sunflower lecithin, sunflower waxes, rice waxes, antioxidant, colorant, maltodextrin, glucose, sweetener, alginate, anhydrous citric acid or lactic acid or acetic acid or a mixture thereof, pectin, cellulose, water, and flavouring. A person of ordinary skill in the art can choose one or another or a combinations thereof depending on the final purpose. The present invention specifically encompass the individual addition of said ingredients or of any group (at least two ingredients) of said ingredients in the anhydrous fatty preparation.

In another preferred embodiment, the oil is in an amount between 30 and 96% by weight with respect to the total preparation, more preferably, in an amount between 70 and 96% by weight with respect to the total preparation.

In another preferred embodiment, the fatty acid mono- and diglycerides-type emulsifier selected from E-471, E-472, E-475 or a mixture thereof is added in an amount between 5 and 40% by weight with respect to the total preparation, more preferably, in an amount between 5 and 25% by weight with respect to the total preparation.

In another preferred embodiment, the glycerol is added in an amount between 0.1 and 12% by weight with respect to the total preparation, more preferably in an amount between 0.1 and 5% by weight with respect to the total preparation.

In another preferred embodiment, the carob and carrageenan are added in an amount between 0.25 and 5% by weight with respect to the total preparation, more preferably in an amount between 0.3 and 3% by weight with respect to the total preparation.

In another preferred embodiment, the oil in step a) is heated to a temperature between 75 and 90° C., more preferably the oil in step a) is heated to a temperature between 80 and 88° C.

In another preferred embodiment, the anhydrous preparation as disclosed in any of the embodiments disclosed herein is to be incorporated in a bakery product.

In another preferred embodiment, the carob and carrageenan in step d) are previously mixed with anhydrous citric acid or lactic acid or acetic acid or a mixture thereof when the fatty preparation is to be incorporated in a bakery product being puff pastry.

In another preferred embodiment, the carob and carrageenan in step d) are previously mixed with sunflower lecithin and rice starch when the fatty preparation is to be incorporated in a bakery product being a cocoa cream ingredient.

In another preferred embodiment, the fatty preparation made by the process disclosed in the first aspect of the invention and all the embodiments included therein is to be incorporated in a product selected from popcorn, extruded snacks, chocolate toppings, prepared dishes, shortbread cookie, nougat, dehydrated soups, cereal bars/cakes, ice creams, cakes, cookies, pastries not based on puff pastry, chocolates, confectionery and jelly beans, toasted bread, cereals, margarine and milk powder, preferably popcorn, cakes, cookies, pastries not based on puff pastry, chocolate toppings, more preferably, cakes, cookies, pastries not based on puff pastry, chocolate toppings.

It is noted that any of the previous embodiments related to the process can be combined each other.

In second aspect, the present invention relates to an anhydrous fatty preparation comprising or consisting of the following components:

a) an oil selected from the group consisting of oleic high sunflower oil, olive oil, extra virgin olive oil, sunflower seed oil, rapeseed oil, grapeseed oil or any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in an amount between 1 and 96% by weight with respect to the total preparation;

b) a fatty acid mono- and diglycerides-type emulsifier selected from E-471, E-472, E-475 or a mixture thereof in an amount between 1 and 60% by weight with respect to the total preparation c) glycerol in an amount between 0.1 and 20% by weight with respect to the total preparation d) carob in an amount between 0.25 and 10% by weight with respect to the total preparation; e) carrageenan in an amount between 0.25 and 10% by weight with respect to the total preparation;

wherein said fatty preparation does not comprise fats with a saturated fat content higher than 35% by weight nor trans fats, nor trans fats, nor animal-derived products, nor totally or partially hydrogenated oils or fats, nor interesterified or transesterified fats, nor palm or coconut-derived oils or fats;

providing that the amount of all the components in the final preparation does not exceed 100%.

In a preferred embodiment, said anhydrous fatty preparation comprises or consists of the following components:

a) an oil selected from the group consisting of high oleic sunflower oil, olive oil, sunflower seed oil, rapeseed oil grapeseed oil or any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in an amount between 30 and 96% by weight with respect to the total preparation b) a fatty acid mono- and diglycerides-type emulsifier selected from E-471, E-472, E-475 or a mixture thereof in an amount between 5 and 40% by weight with respect to the total preparation c) glycerol in an amount between 0.1 and 12% by weight with respect to the total preparation d) carob in an amount between 0.25 and 5% by weight with respect to the total preparation;

e) carrageenan in an amount between 0.25 and 5% by weight with respect to the total preparation;

wherein said fatty preparation does not comprise fats with a saturated fat content higher than 35% by weight nor trans fats, nor trans fats, nor animal-derived products, nor totally or partially hydrogenated oils or fats, nor interesterified or transesterified fats, nor palm or coconut-derived oils or fats;

providing that the amount of all the components in the final preparation does not exceed 100%.

In another preferred embodiment, said anhydrous fatty preparation comprises or consists of the following components:

a) an oil selected from the group consisting of high oleic sunflower oil, olive oil, sunflower seed oil, rapeseed oil grapeseed oil or any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in an amount between 70 and 96% by weight with respect to the total preparation b) a fatty acid mono- and diglycerides-type emulsifier selected from E-471, E-472, E-475 or a mixture thereof in an amount between 5 and 25% by weight with respect to the total preparation c) glycerol in an amount between 0.1 and 5% by weight with respect to the total preparation d) carob in an amount between 0.3 and 2% by weight with respect to the total preparation;

e) carrageenan in an amount between 0.3 and 2% by weight with respect to the total preparation;

wherein said fatty preparation does not comprise fats with a saturated fat content higher than 35% by weight nor trans fats, nor trans fats, nor animal-derived products, nor totally or partially hydrogenated oils or fats, nor interesterified or transesterified fats, nor palm or coconut-derived oils or fats;

providing that the amount of all the components in the final preparation does not exceed 100%.

It is noted that any of the previous embodiments or any element of each embodiment related to the solid fatty preparation can be combined each other, i.e., as an example, component a) of one embodiment can be combined with component b) of another embodiment.

In a preferred embodiment, said anhydrous fatty preparation further comprises at least one of: guar gum, gum Arabic, meal, starch (rice, corn, potato), salt, soy lecithin, sunflower lecithin, antioxidant, colorant, preservative, maltodextrin, glucose, sweetener, alginate, anhydrous citric acid or lactic acid or acetic acid or a mixture thereof, pectin, cellulose, water, and flavouring. A person of ordinary skill in the art can choose one or another or a combinations thereof depending on the final purpose. The present invention specifically encompass the individual addition of said other solid and liquid ingredients or of any group (at least two ingredients) of said other solid and liquid ingredients in the fatty preparation.

In a preferred embodiment, said anhydrous fatty preparation further comprises anhydrous citric acid or lactic acid or acetic acid or a mixture thereof. In another preferred embodiment, said fatty preparation further comprises sunflower lecithin and rice starch. In another preferred embodiment, said fatty preparation further comprises anhydrous citric acid or lactic acid or acetic acid or a mixture thereof, and sunflower lecithin and rice starch.

In a third aspect, the present invention relates to a product selected from a bakery product, a personal care product, cosmetics, dermocosmetics, soaps, varnishes, paints or snacks, preferably a bakery product, comprising the fatty preparation according to the second aspect of the invention and all the embodiments included therein. In a preferred embodiment, said bakery product, a personal care product, cosmetics, dermocosmetics, soaps, varnishes, paints or snacks is selected from popcorn, extruded snacks, chocolate toppings, prepared dishes, shortbread cookie, nougat, dehydrated soups, cereal bars/cakes, ice creams, cakes, cookies, pastries not based on puff pastry, chocolates, confectionery and jelly beans, toasted bread, cereals, margarine and milk powder, preferably popcorn, cakes, cookies, pastries not based on puff pastry, chocolate toppings, more preferably, cakes, cookies, pastries not based on puff pastry, chocolate toppings.

In a particular embodiment, the present invention relates to puff pastry comprising the fatty preparation comprising a) an oil selected from the group consisting of oleic high sunflower oil, olive oil, extra virgin olive oil, sunflower seed oil, rapeseed oil, grapeseed oil, and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in a range between 1% and 96% w/w;

b) a fatty acid mono- and diglycerides-type emulsifier selected from E-471, E-472, E-475 or a mixture thereof preferably in a range between 1 and 60% w/w;

c) glycerol preferably in a range between 1 and 20% w/w;

d) carob preferably in a range between 0.25% and 10% w/w;

e) carrageenan preferably in a range between 0.25% and 10% w/w, f) anhydrous citric acid or lactic acid or acetic acid or a mixture thereof, preferably in a range between 0.1% and 2% w/w, wherein said fatty preparation does not comprise fats with a saturated fat content higher than 35% by weight nor trans fats, nor trans fats, nor animal-derived products, nor totally or partially hydrogenated oils or fats, nor interesterified or transesterified fats, nor palm or coconut-derived oils or fats;

providing that the amount of all the components in the final preparation does not exceed 100%.

In another particular embodiment, the present invention relates to a cocoa cream comprising the fatty preparation comprising a) an oil selected from the group consisting of oleic high sunflower oil, olive oil, extra virgin olive oil, sunflower seed oil, rapeseed oil, grapeseed oil, and any other vegetable oil which is liquid at room temperature containing less than 30% wt of saturated fats, preferably selected from the group consisting of high oleic sunflower oil, olive oil, extra virgin olive oil, sunflower seed oil, rapeseed oil and grapeseed oil, in a range between 1% and 96% w/w;

b) a fatty acid mono- and diglycerides-type emulsifier selected from E-471, E-472, E-475 or a mixture thereof preferably in a range between 1 and 60% w/w;

c) glycerol preferably in a range between 1 and 20% w/w;

d) carob preferably in a range between 0.25% and 10% w/w;

e) carrageenan preferably in a range between 0.25% and 10% w/w, f) sunflower lecithin and rice starch, preferably each in a range between 1% and 10% w/w; wherein said fatty preparation does not comprise fats with a saturated fat content higher than 35% by weight nor trans fats, nor trans fats, nor animal-derived products, nor totally or partially hydrogenated oils or fats, nor interesterified or transesterified fats, nor palm or coconut-derived oils or fats;

providing that the amount of all the components in the final preparation does not exceed 100%.

In a further aspect, the present invention relates to the use of the anhydrous fatty preparation according to any of embodiments disclosed herein, as a substitute component for fat or animal-derived ingredients to be incorporated in a product selected from a bakery product, a personal care product, cosmetics, dermocosmetics, soaps, varnishes, paints or snacks; preferably said product is a bakery product.

The invention will now be further described by way of the following non-limiting examples.

EXAMPLES

Example 1: Manufacture of "Elephant Ears"

The application of the inventive fat in a puff pastry product like "elephant ears" is conducted. In order to do so, a fat formulation is prepared with the following ingredients (% by weight):
62% high oleic sunflower oil
20% E-471
15% glycerin
1.5% carrageenan
1.5% carob Process:
- a) Oil is heated to 80° C. and E-471 is added under stirring when said temperature is reached. Stirring is maintained until total dissolution. The temperature is increased up to 90° C.
- b) The solids are dispersed in glycerin.
- c) The mixture of a) is poured on the product obtained in b)
- d) Stirring is increased until obtaining a homogenous viscous mixture.
- e) The product obtained in d) is packaged in a plastic mixer and cold stored for 24 hours.

"Elephant Ears":

The elephant ears are made following a traditional recipe replacing the complete percentage of palm fat with the fat of the invention. The puff pastry product as obtained has similar characteristics to those of the original product made with palm fat.

Example 2: Manufacture of Brioche

The application of the inventive fat in a non-puff pastry product like brioche is conducted. In order to do so, a fat formulation is prepared with the following ingredients (% by weight):
70% olive oil
20% E-471
7% glycerin
2% carrageenan
1% carob Process:
- a) Oil is heated to 75° C. and E-471 is added under stirring when said temperature is reached. Stirring is maintained until total dissolution. The temperature is increased up to 85° C.
- b) The solids are dispersed in glycerin.
- c) The mixture of a) is poured on the product obtained in b)
- d) Stirring is increased until obtaining a homogenous viscous mixture.
- e) The product obtained in d) is packaged in a plastic mixer and cold stored for 24 hours.

Brioche:

The brioche is made following a traditional recipe replacing the complete percentage of fat with the fat of the invention. The product as obtained has similar characteristics to those of the original product made with harmful fats.

The invention claimed is:

1. A process for making an anhydrous fatty preparation comprising the steps of:
- a) heating an oil selected from the group consisting of high oleic sunflower oil, olive oil, extra virgin olive oil, sunflower seed oil, rapeseed oil, grapeseed oil, and any other vegetable oil which is liquid at room temperature containing less than 30% by weight of saturated fats, wherein said oil is present in an amount of at least 30% by weight with respect to the total fatty preparation in a mixer up to between 60° C. and 95° C.;
- b) adding a fatty acid mono- and diglycerides-type emulsifier selected from E-471, E-472, E-475, or a mixture thereof in an amount between 5% by weight and 60% by weight with respect to the total fatty preparation to the mixer of step a) until obtaining complete dissolution of the mixture of oil and emulsifier to form a solution;
- c) increasing the temperature of the solution in step b) to or maintaining said temperature at a maximum of 95° C.;
- d) adding glycerol in an amount between 0.1% by weight and 20% by weight with respect to the total fatty preparation into a mixer and dispersing carob and carrageenan in an amount of each between 0.25% by weight and 10% by weight with respect to the total fatty preparation into the glycerol until a homogeneous semi-solid is obtained;
- e) pouring the solution of step c) over the semi-solid obtained in step d) until a viscous homogeneous liquid is obtained, providing that the amount of the components added in steps a) to d) does not exceed 100%, and wherein said fatty preparation does not comprise fats with a saturated fat content higher than 35% by weight, trans fats, animal-derived products, totally or partially hydrogenated oils or fats, interesterified or transesterified fats, or palm or coconut-derived oils or fats.

2. The process according to claim 1, further comprising the step of:
- f) packing the liquid obtained in step e) and, optionally, storing the packed liquid in a refrigerator for at least 24 hours.

3. The process according to claim 1, comprising in step d) in addition to carob and carrageenan, adding at least one of the following ingredients: guar gum, gum Arabic, meal, starch, modified starch, salt, soy lecithin, sunflower lecithin, sunflower waxes, rice waxes, antioxidant, colorant, maltodextrin, glucose, sweetener, alginate, anhydrous citric acid, anhydrous lactic acid, anhydrous acetic acid, a mixture of said anhydrous acids, pectin, cellulose, and flavoring.

4. The process according to claim 1, comprising adding the fatty acid mono- and diglycerides-type emulsifier selected from E-471, E-472, E-475 or a mixture thereof in an amount between 5% by weight and 40% by weight with respect to the total fatty preparation; or adding the glycerol in an amount between 0.1% by weight and 5% by weight with respect to the total fatty preparation; or adding the carob and carrageenan in an amount between 0.25% by weight and 5% by weight with respect to the total fatty preparation.

5. The process according to claim 1, wherein in step b) the fatty acid mono- and diglycerides-type emulsifier selected from E-471, E-472, E-475 or a mixture thereof is added in an amount between 5% by weight and 40% by weight with respect to the total fatty preparation; and in step d) the glycerol is added in an amount between 0.1% by weight and 12% by weight with respect to the total fatty preparation and the carob an carrageenan are added each in an amount between 0.25% and 5% by weight with respect to the total fatty preparation.

6. The process according to claim 1, wherein in step a) said oil is added in an amount of at least 62% by weight with respect to the total fatty preparation; in step b) the fatty acid mono- and diglycerides-type emulsifier selected from E-471, E-472, E-475 or a mixture thereof is added in an amount between 5% by weight and 25% by weight with respect to the total fatty preparation; and in step d) the glycerol is added in an amount between 0.1% by weight and 20% by weight with respect to the total fatty preparation and the carob an carrageenan are added each in an amount between 0.25% and 10% by weight with respect to the total fatty preparation.

7. The process according to claim 1, wherein carob and carrageenan in step d) are previously mixed with anhydrous citric acid or anhydrous lactic acid or anhydrous acetic acid or a mixture thereof when the fatty preparation is to be incorporated in a bakery product being puff pastry.

8. The process according to claim 1, wherein carob and carrageenan in step d) are previously mixed with sunflower lecithin and rice starch when the fatty preparation is to be incorporated in a bakery product being a cocoa cream.

9. An anhydrous fatty preparation comprising the following components:
   a) an oil selected from the group consisting of oleic high sunflower oil, olive oil, extra virgin olive oil, sunflower seed oil, rapeseed oil, grapeseed oil, and any other vegetable oil which is liquid at room temperature containing less than 30% by weight of saturated fats, wherein said oil is present in an amount of at least 30% by weight with respect to the total fatty preparation;
   b) a fatty acid mono- and diglycerides-type emulsifier selected from E-471, E-472, E-475, or a mixture thereof in an amount between 5% by weight and 60% by weight with respect to the total fatty preparation;
   c) glycerol in an amount between 0.1% by weight and 20% by weight with respect to the total fatty preparation;
   d) carob in an amount between 0.25% by weight and 10% by weight with respect to the total fatty preparation;
   e) carrageenan in an amount between 0.25% by weight and 10% by weight with respect to the total fatty preparation;
   wherein said fatty preparation does not comprise fats with a saturated fat content higher than 35% by weight, trans fats, animal-derived products, totally or partially hydrogenated oils or fats, interesterified or transesterified fats, or palm or coconut-derived oils or fats;
   providing that the amount of all the components in the total fatty preparation does not exceed 100%.

10. The anhydrous fatty preparation according to claim 9, wherein the components are present independently in the final composition in the following ranges (% w/w):
   b) the fatty acid mono- and diglycerides-type emulsifier selected from E-471, E-472, E-475, or a mixture thereof in an amount between 5% and 40% with respect to the total fatty preparation;
   c) glycerol in an amount between 0.1% and 12% with respect to the total fatty preparation
   d) carob in an amount between 0.25% and 5% with respect to the total fatty preparation;
   e) carrageenan in an amount between 0.25% and 5% with respect to the total fatty preparation;
   providing that the amount of all the components in the total fatty preparation does not exceed 100%.

11. The anhydrous fatty preparation according to claim 9, wherein components are present independently in the total fatty preparation in the following ranges (% w/w):
   a) said oil selected from the group consisting of high oleic sunflower oil, olive oil, sunflower seed oil, rapeseed oil, grapeseed oil, or any other vegetable oil which is liquid at room temperature containing less than 30% of saturated fats, wherein said oil is present in an amount of at least 70% with respect to the total fatty preparation;
   b) the fatty acid mono- and diglycerides-type emulsifier selected from E-471, E-472, E-475, or a mixture thereof in an amount between 5% and 25% with respect to the total preparation;
   c) glycerol in an amount between 0.1% and 5% with respect to the total fatty preparation;
   d) carob in an amount between 0.3% and 2% with respect to the total fatty preparation;
   e) carrageenan in an amount between 0.3% and 2% with respect to the total fatty preparation;
   providing that the amount of all the components in the total fatty preparation does not exceed 100%.

12. The anhydrous fatty preparation according to claim 9, further comprising:
   anhydrous citric acid; anhydrous lactic acid; anhydrous acetic acid; sunflower lecithin; rice starch; or a mixture thereof.

13. A product selected from a bakery product, a personal care product, cosmetics, dermocosmetics, soaps, varnishes, paints or snacks, comprising the fatty preparation according to claim 9.

14. The product according to claim 13, wherein said product is a bakery product.

15. The product according to claim 13, wherein fatty preparation further comprises anhydrous citric acid, anhydrous lactic acid, or anhydrous acetic acid or a mixture thereof, and wherein the product is a puff pastry.

16. The product according to claim 15, comprising 0.1% by weight to 2% by weight of anhydrous citric acid, anhydrous lactic acid, anhydrous acetic acid, or a mixture thereof.

17. The product according to claim 13, wherein the product is a cocoa cream, and wherein the fatty preparation further comprises sunflower lecithin and rice starch.

18. The anhydrous fatty preparation according to claim 9, wherein components are present independently in the total fatty preparation in the following ranges (% w/w):
   a) said oil selected from the group consisting of high oleic sunflower oil, olive oil, sunflower seed oil, rapeseed oil, grapeseed oil, or any other vegetable oil which is liquid at room temperature containing less than 30% of saturated fats, wherein said oil is present in an amount of at least 62% with respect to the total fatty preparation;
   b) a fatty acid mono- and diglycerides-type emulsifier selected from E-471, E-472, E-475, or a mixture thereof in an amount between 5% and 25% with respect to the total preparation;
   c) glycerol in an amount between 0.1% and 20% with respect to the total fatty preparation;
   d) carob in an amount between 0.25% and 10% with respect to the total fatty preparation;
   e) carrageenan in an amount between 0.25% and 10% with respect to the total fatty preparation;
   providing that the amount of all the components in the total fatty preparation does not exceed 100%.

19. The anhydrous fatty preparation according to claim 18, further comprising at least one of the following ingredients: guar gum, gum Arabic, meal, starch, modified starch, salt, soy lecithin, sunflower lecithin, sunflower waxes, rice waxes, antioxidant, colorant, maltodextrin, glucose, sweetener, alginate, anhydrous citric acid, anhydrous lactic acid, anhydrous acetic acid, a mixture of said anhydrous acids, pectin, cellulose, and flavoring.

20. The anhydrous fatty preparation according to claim 9, further comprising at least one of the following ingredients: guar gum, gum Arabic, meal, starch, modified starch, salt, soy lecithin, sunflower lecithin, sunflower waxes, rice waxes, antioxidant, colorant, maltodextrin, glucose, sweetener, alginate, anhydrous citric acid, anhydrous lactic acid, anhydrous acetic acid, a mixture of said anhydrous acids, pectin, cellulose, and flavoring.

* * * * *

UNITED STATES PATENT AND TRADEMARK OFFICE
CERTIFICATE OF CORRECTION

PATENT NO. : 12,193,453 B2  
APPLICATION NO. : 17/046457  
DATED : January 14, 2025  
INVENTOR(S) : Carolina Cristina Benedí Santamaria et al.

It is certified that error appears in the above-identified patent and that said Letters Patent is hereby corrected as shown below:

In the Claims

At Column 11, Line 2, "carob an carrageenan" should be -- carob and carrageenan --.

At Column 11, Line 15, "carob an carrageenan" should be -- carob and carrageenan --.

At Column 11, Line 63, "preparation" should be -- preparation; --.

Signed and Sealed this  
Seventeenth Day of June, 2025

Coke Morgan Stewart  
*Acting Director of the United States Patent and Trademark Office*